United States Patent
Osawa

(10) Patent No.: US 7,108,416 B1
(45) Date of Patent: Sep. 19, 2006

(54) PLANAR LIGHT SOURCE

(75) Inventor: Hideharu Osawa, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 09/937,664

(22) PCT Filed: Mar. 28, 2000

(86) PCT No.: PCT/JP00/01900

§ 371 (c)(1),
(2), (4) Date: Sep. 28, 2001

(87) PCT Pub. No.: WO00/58665

PCT Pub. Date: Oct. 5, 2000

(30) Foreign Application Priority Data

Mar. 29, 1999 (JP) ................. 11-086342
Mar. 29, 1999 (JP) ................. 11-086405

(51) Int. Cl.
*F21V 7/04* (2006.01)
*G02F 1/13* (2006.01)

(52) U.S. Cl. ............ 362/618; 362/600; 362/606; 362/609; 362/610

(58) Field of Classification Search .......... 359/884, 359/839; 362/31, 293, 330, 327, 84, 260, 362/34, 600–633; 40/542; 385/120; 349/71
See application file for complete search history.

(56) References Cited

U.S. PATENT DOCUMENTS

| | | | | |
|---|---|---|---|---|
| 4,205,522 A | * | 6/1980 | Takami | 368/84 |
| 5,579,134 A | * | 11/1996 | Lengyel | 349/62 |
| 6,086,211 A | * | 7/2000 | Ohkawa | 362/620 |
| 6,092,904 A | * | 7/2000 | Tai et al. | 362/31 |
| 6,356,691 B1 | * | 3/2002 | Seong-jin et al. | 385/120 |
| 6,406,158 B1 | * | 6/2002 | Ohkawa | 362/31 |
| 6,425,674 B1 | * | 7/2002 | Su | 362/31 |
| 6,577,359 B1 | * | 6/2003 | Ishihara | 349/63 |
| 6,755,546 B1 | * | 6/2004 | Ohkawa | 362/31 |
| 2003/0095401 A1 | * | 5/2003 | Hanson et al. | 362/84 |

FOREIGN PATENT DOCUMENTS

| | | | |
|---|---|---|---|
| JP | 54-092345 A | | 7/1979 |
| JP | 62-153938 A | | 7/1987 |
| JP | 05-072532 A | | 3/1993 |
| JP | 05-203948 A | | 8/1993 |
| JP | 05203948 A | * | 8/1993 |
| JP | 07-104296 A | | 4/1995 |
| JP | 07-218912 A | | 8/1995 |
| JP | 07-281032 A | | 10/1995 |
| JP | 07-294745 A | | 11/1995 |
| JP | 08-007614 A | | 1/1996 |
| JP | 08-094844 A | | 4/1996 |

(Continued)

*Primary Examiner*—Sandra O'Shea
*Assistant Examiner*—Anabel Ton
(74) *Attorney, Agent, or Firm*—Sughrue Mion, PLLC

(57) ABSTRACT

A surface illuminant comprises a light source 11 consisting of LEDs, a light guide plate 12 which is optically coupled to said light source for guiding the light to one side thereof and a reflective film 13 which is disposed on the other opposite side of said light guide plate. The light guide plate 12 is made of a material into which a wave length converting material 14 or a light storage material 15 such as fluorescent material is incorporated. A desired color light can be obtained by converting the wave length of the light from the light source 11 or light can be emitted by storing the light when the light source is turned off.

5 Claims, 3 Drawing Sheets

FOREIGN PATENT DOCUMENTS

| JP | 08-129176 A | 5/1996 |
| JP | 09-138400 A | 5/1997 |
| JP | 09-164622 A | 6/1997 |
| JP | 10-154409 A | 6/1998 |

* cited by examiner

PLANAR LIGHT SOURCE

TECHNICAL FIELD

The present invention relates to a surface illuminant including light emitting diodes (LEDs) and the like which are used as a light source and in particular to a surface illuminant which is capable of emitting a desired color light and is capable of reducing the electric power consumption.

BACKGROUND TECHNOLOGY

LED back light sources using a reflection plate have been widely used as a surface illuminant for compact display used for, for example, cellular phones.

FIG. 6 is an exploded perspective view showing a prior art surface illuminant which is exploded. In the drawing, a reference numeral 101 denotes a light source comprising, for example, LEDs or CFL (cold fluorescent tubes); 102 denotes a light guide plate which is adjacent to said light source. The light guide plate 102 is formed of a white and transparent plate made of polycarbonate or acrylic resin, etc. The light guide plate 102 has a flat face from which light is emitted and a reverse face on which a multiplicity of prism-like grooves in which the distance between the grooves becomes narrower as it is more distant from the light source are formed as shown in the drawing by etching or sand blast process, so that the light from the light source will be reflected on the faces of the grooves for uniformly emitting light from the entire surface of the light guide plate 102. A reference 103 denotes a white reflective film made of an appropriate synthetic resin such as polyester (PET), polycarbonate, which is bonded to the edge of the reverse side of the light guide plate 102 with a both-sided adhesive tape. The film 103 reflects the light which has been transmitted through the faces of the grooves having prism-like cross section for guiding the light to the light guide plate 102 again so that it is emitted externally from the surface of the light guide plate 102.

In the above-mentioned arrangement, when the light source 101 is lit, the light from the light source 101 is transmitted through the light guide plate 102 and is then reflected on the prism-like faces formed on its reverse side or alternatively it is transmitted through the prism-like face and is reflected on the reflective film 103, and is incident upon the light guide plate 102, where it is mixed with the reflected light for substantially uniformly illuminating the entire surface of the light guide plate 102.

At this time, the light from the light source is emitted as back light having unchanged color since the light guide plate is colorless and transparent.

It has been known that a problem occurs in which a surface illuminant having white and intermediate color can not be obtained since LED is not capable of emitting white or intermediate color light when LEDs are used as light source.

(1) In order to overcome this problem, JA-P-7-176794 proposes a surface illuminant comprising a fluorescent light scattering layer made of a mixture of a fluorescent material with white powder for scattering fluorescent light, which are applied on either one of the sides of a light guide plate in which light emitted from blue light LEDs is subjected to wave-length conversion by said fluorescent light scattering layer and a desired color including white color can be provided by changing the fluorescent material.

(2) Alternatively, JP-A-8-7614 proposes a surface illuminant comprising a scattering layer which is formed by applying white powders for scattering fluorescent light on either one of the sides of a light guide plate and further comprising a transparent film containing a fluorescent material, which is disposed on the main face of the light guide plate opposite to said scattering layer, whereby desired colors including white color can be provided.

However, it is inconvenient that the fluorescent scattering layer should be applied (printed) on the light guide plate since the fluorescent material is directly applied upon the light guide plate in the surface illuminant as set forth in paragraph (1). Since the color tone may change depending upon the mixture ratio between the fluorescent material and white powder for scattering fluorescent light, a desired color can not be readily obtained.

In the surface illuminant as set forth in paragraph (2), it is also necessary to apply the fluorescent material and to provide a transparent film on which the fluorescent material is to be applied on the surface of the light guide plate in addition to the reflective plate provided on the reverse side of the light guide plate. This type of surface illuminant is complicated in structure and its assembly requires a long time and much labor.

Since the light in the light guide plate is terminated unless the light source is continuously lit in the above-mentioned both surface illuminants, it is necessary to constantly turn on the light source when the surface illuminant is used. This problem is not negligible in the portable electronic devices such as cellular phones from the view point of power consumption since all the power is supplied from a battery cell.

DISCLOSURE OF THE INVENTION

It is an object of the present invention to overcome the above-mentioned problems that the prior art surface illuminants encounter and to provide means which is capable of emitting white or intermediate color with a simple structure in a surface illuminant using LED light sources and enables the surface illuminant to continuously emit light without causing LEDs to continuously emit light.

The means which accomplishes the object will now be described.

[First Means]

The first means resides in a surface illuminant comprising a light source, a light guide plate which is optically coupled to said light source for emitting light incident from said light source through one side thereof; and a reflective film which is disposed on the other side of said light in which a wave length converting material is applied on said reflective film.

Since the surface illuminant of the first means includes the wave length converting layer on the reflective film of the surface illuminant, the reflective film per se may be prior art white color reflective film. Accordingly, the surface illuminant of white and intermediate color can be readily obtained. The surface illuminant of desired color can be obtained by merely changing the reflective film.

[Second Means]

The second means resides in a surface illuminant comprising a light source, a light guide plate which is optically coupled to said light source for emitting light incident from said light source through one side thereof; and a reflective film which is disposed on the other side of said light guide in which said reflective film comprises a light storage material.

Since the reflective film of the surface illuminant includes a light storage film in the surface illuminant of the second means, the surface illuminant is capable of continuously emitting light even if the light source is turned off for a predetermined period of time. The power consumption of the surface illuminant can be remarkably reduced.

[Third Means]

The third means resides in a surface illuminant comprising a light source, a light guide plate which is optically coupled to said light source for emitting light incident from said light source through one side thereof; and a reflective film which is disposed on the other side of said light guide in which said light guide plate is made of a transparent material in which a light storage material is blended.

Since the light guide plate into which the light storage material is incorporated is provided in the surface illuminant of the third means, the surface illuminant which is capable of storing light can be readily obtained without specially treating the prepared light guide plate. Since the surface illuminant is capable of emitting light even if the light source is turned off, the power consumption of the surface illuminant ca be remarkably reduced.

[Fourth Means]

The fourth means resides in a surface illuminant comprising a light source, a light guide plate which is optically coupled to said light source for emitting light incident from said light source through one side thereof; and a reflective film which is disposed on the other side of said light guide in which a light storage material is formed on the surface of said light guide plate.

Since the light storage film is formed on the light guide plate in the surface illuminant of the fourth means, the concentration of the light storage material, that is the amount of stored light can be relatively easily adjusted by controlling the amount of the applied light storage material.

[Fifth Means]

The fifth means resides in a surface illuminant of the fourth means in which the concentration of the light storage material in said light storage layer is increased from its one end adjacent to the light source to the other end thereof.

The illumination of the surface illuminant can be kept substantially uniform over the entire surface thereof by compensating for the attenuation of the light emitted to the light guide plate from the light source due to the fact that the concentration of the light storage material in the light guide plate is increased in accordance with the distance from the light source.

BEST MODES FOR EMBODYING THE INVENTION

Embodiment of the surface illuminant of the present invention will now be described.

Figure 1:
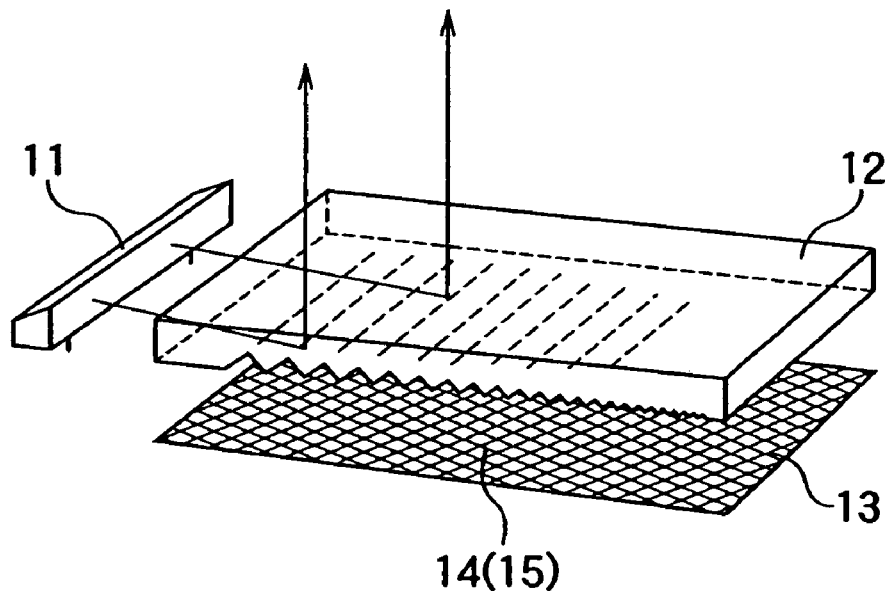
FIG. 1 is an exploded perspective view showing the surface illuminant of the first and second embodiments of the present invention.

FIG. 1 shows first and second embodiments of the present invention.

FIRST EMBODIMENT

In FIG. 1, reference numerals 11, 12 and 13 denote a light source; a light guide plate made of a colorless transparent synthetic resin such as polycarbonate or acrylic resin, which is formed on its reverse side with prism-like grooves; and a reflective film made of PET or polycarbonate, respectively. These structures are substantially identical with those of prior art which have been described with reference to FIG. 6.

In the surface illuminant, the light guide plate 12 is substantially rectangular in shape. The light source 11 is disposed adjacent to the light guide plate 12 so that light is incident upon one end face of the light guide plate 12 from, for example blue color LEDs. The reflective film 13 is disposed to cover the reverse side of the light guide plate 12. A wave length converting layer 14 is provided on the reflective film 13.

The wave length converting layer 14 is formed by applying a solution of a wave-length converting material such as a fluorescent material which is excited on exposure to ultraviolet rays from the light source such as YAG for emitting fluorescent light. The solution contains the wave length material, a resin such as acrylic resin and a proper solvent. Accordingly, when, for example, the blue color LEDs are used as the light source 11, the ultraviolet rays from the blue color LEDs are subjected to wave length conversion, so that fluorescent light is emitted.

Of course, it is possible to use the light guide plate 12 which is formed with convexes and concaves having different densities and sizes depending upon the distance from the light source by embossing in lieu of the prism-like grooves on the reverse side thereof.

In order to obtain the white color light, a fluorescent material (which is obtained by mixing equal amounts of red and green fluorescent pigments) which emits yellow color light on exposure to ultraviolet rays is used.

In the above-mentioned arrangement, when blue color LEDs are lit, part of light incident upon the light guide plate is transmitted through the prism-like face of the light guide plate and will impinge upon the reflective film 13. At this time, the wave length of the ultraviolet rays in the transmitted light is converted with the fluorescent material in the film so that the ultraviolet rays are converted into yellow reflected light. The reflected light is transmitted through the prism-like face again and enter the light guide plate, where it is mixed with blue color from the LEDs to become white color light.

A surface illuminant which is capable of emitting critical and delicate intermediate color light which has been heretofore difficult to obtain can be provided by appropriately selecting the fluorescent material 14 and the wave length of the light source 11.

A surface illuminant which has an excellent light emission efficiency even if light having the same color as that of the light source can be obtained by providing the reflective film with a fluorescent material which emits light having the same wave length as that of the light source 11. The power consumption of the surface illuminant can be made less.

SECOND EMBODIMENT

The first embodiment in which the reflective film comprises the fluorescent material has been described. Now, a second embodiment of the surface illuminant of the present invention will be described. The surface illuminant comprises a light storage material (a material which absorbs the light rays emitted from the light source for emitting light for a predetermined period of time after light rays from the light source disappear, for example, "N YAKOH" (trade name) manufactured by Nemoto Kagaku Co. Ltd.) in lieu of the reflective film.

In the second embodiment, the reflective film made of a synthetic resin includes a light storage material 15. The light storage material 15 which is in the form of a solution including a resin as a binder and an appropriate solvent similarly to the case of said fluorescent material is applied on the reflective film or alternatively the light storage material 15 is incorporated in the transparent (transmissive) reflective film. If the light storage material is incorporated in the reflective film, a reflective layer having white color is formed on the lower side of the reflective film. If the light storage material is applied on the reflective film, the light storage material to be used specifically may include, for example, "CHIKKO INK" and "N YAKOH CHIKKO INK" (trade names) manufactured by Teikoku Ink Co. Ltd.

Figure 2:
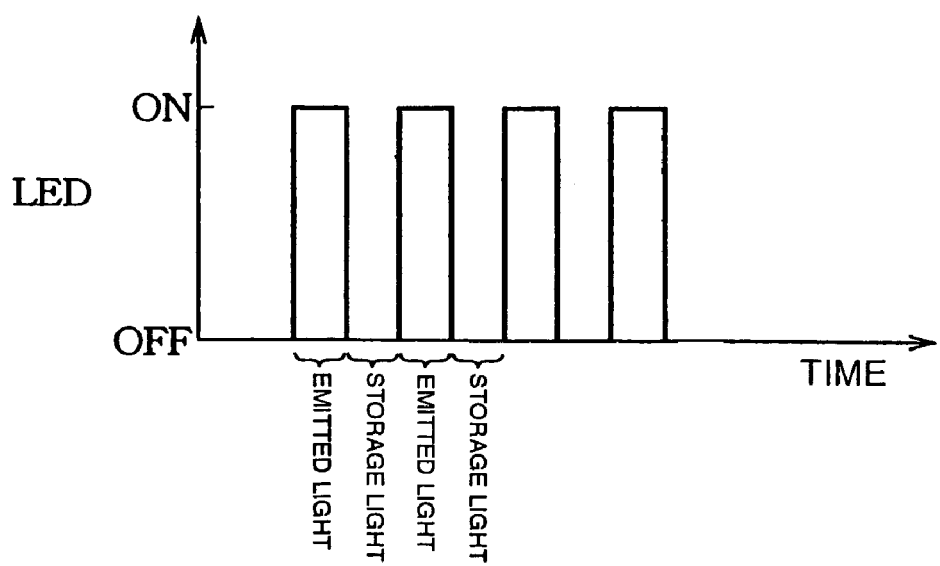
FIG. 2 is a view explaining a condition of driving the illuminant in the present invention.

When the light source of, for example, blue light LEDs is lit in the arrangement of the second embodiment, part of the light which is incident on the light guide plate is transmitted through the prism like face of the light guide plate and impinges on the reflective film 13. At this time, part of the impinged light is stored by the light storage material 15 of the reflective film. The stored light will be emitted for a predetermined period of time after turning off the light source since the surface illuminant of the present invention is capable of emitting light for a predetermined period of time by the spontaneously emitted light from the light storage material after the turning off of the light source in such a manner, the surface illuminant can continuously emit light by repeating turning on and off the light source as shown in FIG. 2. The power consumption can be remarkably reduced in comparison with the prior art since it is not necessary to continuously turn on the light source. The illumination of the surface illuminant can be kept uniform over the entire of the light emitting surface by increasing the amount of the applied light storing material 15 on the reflected film depending upon the distance from the light source to compensate for the attenuation of the light emitted into the light guide plate from the light source.

THIRD EMBODIMENT

Figure 3:
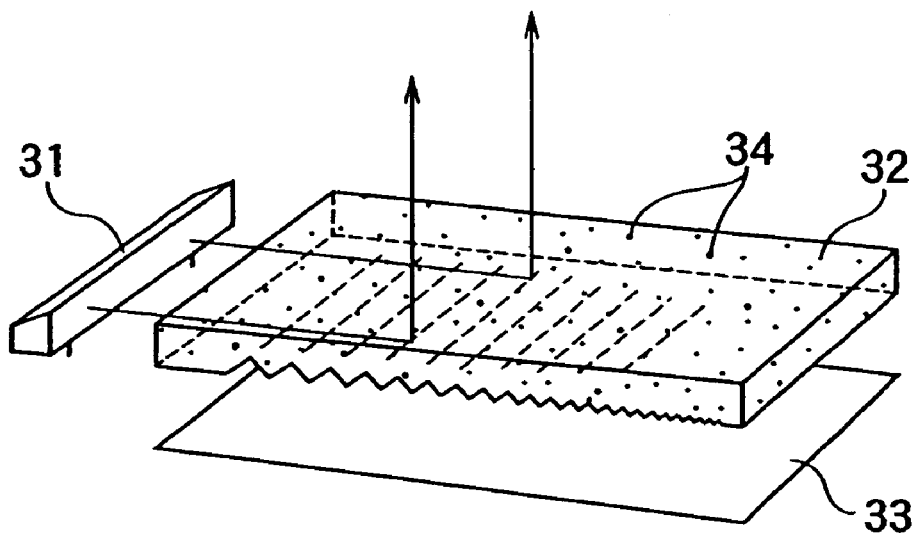
FIG. 3 is an exploded perspective view showing the surface illuminant of the third embodiment of the present invention.

FIG. 3 shows a third embodiment of the present invention. In FIG. 3, reference numerals 31, 32 and 33 denote a light source; a light guide plate made of a colorless transparent synthetic resin such as polycarbonate or acrylic resin, which is formed on its reverse side prism-like grooves; and a reflective film made of PET or polycarbonate, respectively.

The light guide plate 32 is substantially rectangular in shape. The light source 31 is disposed adjacent to the light guide plate 32 so that light is incident upon one end face of the guide plate 32 from, for example blue color LEDs. The reflective film 33 is disposed to cover the reverse side of the light guide plate 32.

Figure 6:
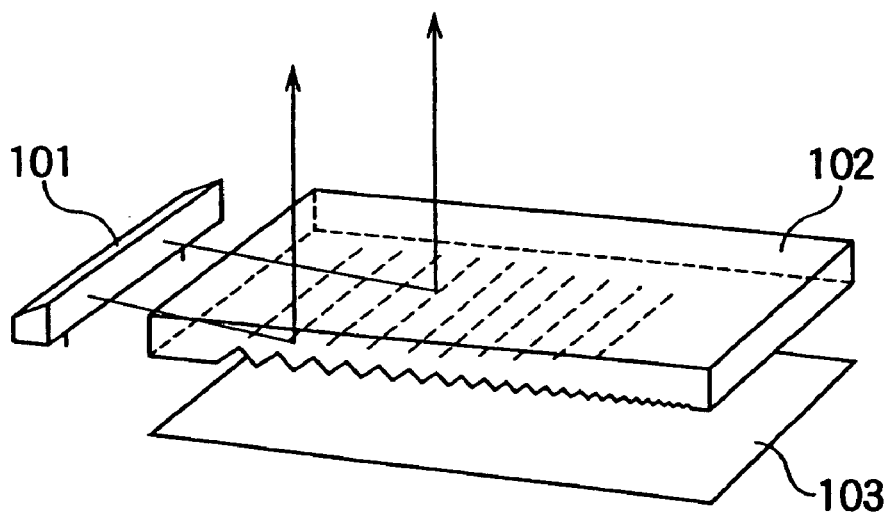
FIG. 6 is an exploded perspective view showing a prior art surface illuminant.

The structure is substantially identical with that of the prior art shown in FIG. 6. In the third embodiment of the surface illuminant of the present invention, the light guide plate 32 is made of a colorless transparent synthetic resin such as polycarbonate or acrylic resin, in which a light storage material 34 is incorporated.

It is of course to use the light guide plate 32 which is formed with convexes and concaves having different densities and sizes depending upon the distance from the light source by embossing in lieu of the prism-like grooves on the reverse side thereof.

FOURTH EMBODIMENT

Figure 4:
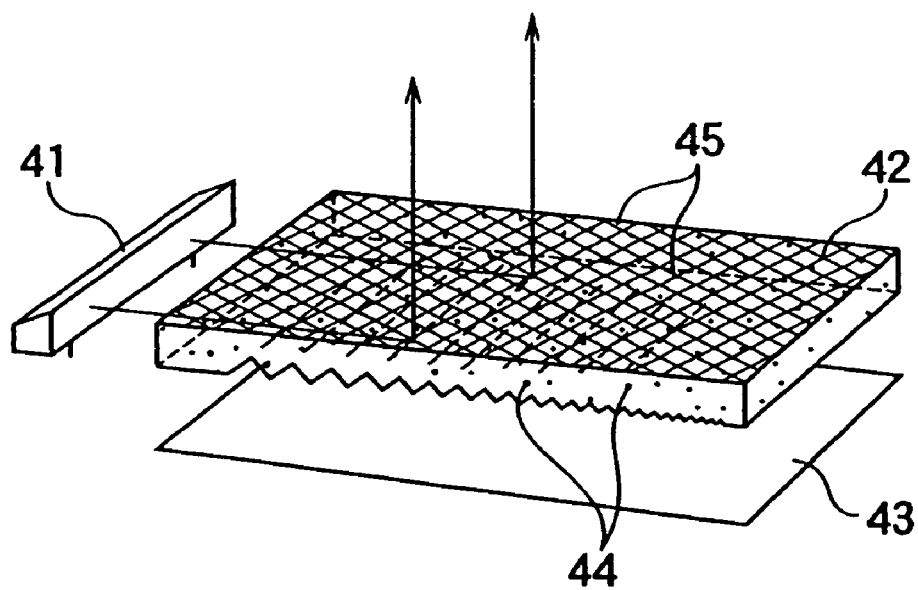
FIG. 4 is an exploded perspective view showing the surface illuminant of the fourth embodiment of the present invention.

FIG. 4 shows a fourth embodiment of the present invention. In FIG. 4, reference numerals 41, 42 and 43 denote a light source; a light guide plate made of a colorless transparent synthetic resin such as polycarbonate or acrylic resin, which is formed on its reverse side prism-like grooves; and a reflective film made of PET or polycarbonate, respectively. Reference numerals 44 and 45 denote light storage material and a light storage layer, respectively.

The fourth embodiment is substantially identical with the third embodiment in that the light guide plate 42 is made of a colorless transparent synthetic resin such as polycarbonate or acrylic resin, which is blended with a light storage material although it is different from the third embodiment in that the light storage layer 45 is formed by applying the light storage material on the face side and/or reverse side of the light guide plate.

FIFTH EMBODIMENT

Figure 5:
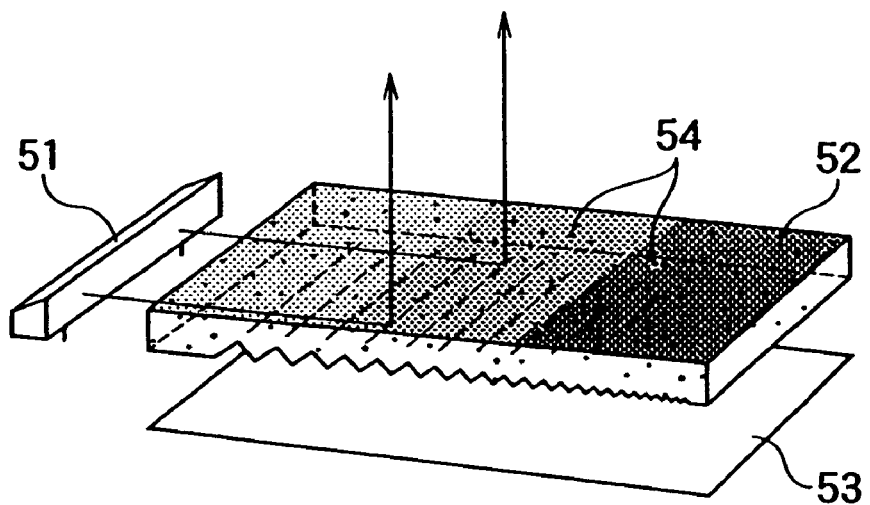
FIG. 5 is an exploded perspective view showing the surface illuminant of the fifth embodiment of the present invention.

FIG. 5 shows a fifth embodiment of the present invention. In FIG. 5, reference numerals 51, 52 and 53 denote a light source; a light guide plate made of a colorless transparent synthetic resin such as polycarbonate or acrylic resin, which is formed on its reverse side prism-like grooves; and a reflective film made of PET or polycarbonate, respectively. A reference numeral 54 denotes light storage layer.

The fifth embodiment shows one example of detailed means for increasing the concentration of the light storage layer from one end adjacent to the light source to the other end so that the concentration of the light storage layer 54 of the light guide layer 52 is increased depending upon the distance from the light source 51. In this case, a plurality of stripes of ink each having different concentration of the light storage material which are applied from one end adjacent to the light source to the other end when such an arrangement is adopted, the illumination of the surface illuminant can be kept uniform over the entire light emitting surface by the light storage layer compensating for the attenuation of the light since the amount of the relative stored light in the light guide plate is reversely proportional to the distance from the light source even if the light incident upon the light guide plate attenuates as it travels far from the light source.

Although the fourth and fifth embodiments in which the light guide plate is blended with the light storage material have been described, the present invention is not limited to those embodiments. The light guide plate which is not blended with the light storage material may be used.

If the light storage material is applied on the face of the light guide plate, a solvent of the light storage material is prepared by mixing it with a resin binder and an appropriate solvent. The solvent is applied on the face and reverse sides of the light guide plate. The light storage material to be used specifically may include, for example, "CHIKKO INK" and "N YAKOH CHIKKO INK" (trade names) manufactured by Teikoku Ink Co. Ltd.

When the light source 21, 31, 41, 51 is lit in the arrangement in FIGS. 1, 3, 4, 5, part of the light which is incident on the light guide plate is stored in the light storage material 15 of the reflective film, the light storage material 34, 44, 54 in the light guide plate and/or the light storage layer 45 applied on the face and reverse sides of the light storage plate. The stored light is emitted for a predetermined period of time after turning off the light source since the surface illuminant of the present invention is capable of emitting light for a predetermined period of time after the turning off of the light source.

Since the surface illuminant of the present invention is capable of emitting light for a certain period of time by the spontaneously emitted light from the light storage material after turning off of the light source, the surface illuminant is capable of uniformly and continuously emitting light by repeating turning on or off of the light source as shown in FIG. 2. The power consumption can be remarkably reduced in comparison with the prior art since it is not necessary to continuously turn on the light source.

The invention claimed is:

1. A surface illuminant comprising a light source, a light guide plate having opposed sides and being optically coupled to said light source for emitting light incident from said light source through one opposed side thereof, said light guide plate being formed with convexes and concaves having different densities or sizes depending upon the distance from the light source on one side thereof, and a reflective film which is disposed on the other opposed side of said light guide plate, wherein said reflective film comprises a light storage material incorporated in the reflective film, wherein said storage material permits emission of light for a period of time after light from said light source disappears.

2. A surface illuminant comprising a light source, a light guide plate having opposed sides and being optically coupled to said light source for emitting light incident from said light source through one opposed side thereof, said light guide plate being formed with convexes and concaves having different densities or sizes depending upon the distance from the light source on one side thereof, and a reflective film which is disposed on the other opposed side of said light guide plate, wherein said light guide plate is made of a transparent material in which a light storage material is blended.

3. A surface illuminant comprising a light source, a light guide plate having opposed sides and being optically coupled to said light source for emitting light incident from said light source through one opposed side thereof, said light guide plate being formed with convexes and concaves having different densities or sizes depending upon the distance from the light source on one side thereof, and a reflective film which is disposed on the other opposed side of said light guide plate, wherein a light storage film is formed on the surface of said light guide plate.

4. A surface illuminant as set forth in claim 3,
wherein the concentration of the light storage material in said light storage layer is increased from its one end adjacent to the light source to the other end thereof.

5. A surface illuminant comprising a light source, a light guide plate having opposed sides which is optically coupled to said light source for emitting light incident from said light source through one opposed side thereof, and a reflective film which is disposed on the other opposed side of said light guide plate, wherein a light storage film is formed on the surface of said light guide plate, and wherein the concentration of the light storage material in said light storage layer is increased from its one end adjacent to the light source to the other end thereof.

* * * * *